United States Patent [19]

Herpers et al.

[11] 4,150,104
[45] Apr. 17, 1979

[54] METHOD FOR REMOVING HYDROGEN SULFIDE FROM GASES AND FOR OBTAINING ELEMENTAL SULFUR

[75] Inventors: Edmund-Theodor Herpers, Bochum; Horst Ritter, Essen, both of Fed. Rep. of Germany

[73] Assignee: C. Otto & Comp. G.m.b.H., Bochum, Fed. Rep. of Germany

[21] Appl. No.: 839,245

[22] Filed: Oct. 3, 1977

[51] Int. Cl.$^2$ .............................................. C01B 17/00
[52] U.S. Cl. ................................................ 423/574 R
[58] Field of Search .............. 423/224, 573, 574, 576, 423/564

[56] References Cited

U.S. PATENT DOCUMENTS

| | | | |
|---|---|---|---|
| 3,752,877 | 8/1973 | Beavon | 423/564 |
| 3,798,308 | 3/1974 | Tatterson | 423/574 |
| 3,864,460 | 2/1975 | Connell | 423/574 |
| 4,001,386 | 1/1977 | Klein et al. | 423/574 |
| 4,041,130 | 8/1977 | Mackles | 423/564 X |
| 4,044,100 | 8/1977 | McElroy | 423/228 |

FOREIGN PATENT DOCUMENTS 1,444,127  7/1976  United Kingdom ..................... 423/574

*Primary Examiner*—G. O. Peters
*Attorney, Agent, or Firm*—Thomas H. Murray; Clifford A. Poff

[57] ABSTRACT

A method for removing hydrogen sulfide from gases, particularly coke oven gas, and for obtaining elemental sulfur in a Claus plant, characterized in that sulfur dioxide and elemental sulfur in the residual gases from the Claus plant are hydrogenated to form hydrogen sulfide which is mixed with incoming coke oven gas or the like prior to passing into a hydrogen-sulfide scrubbing unit. In this manner, essentially no sulfur compounds escape into the atmosphere.

2 Claims, 1 Drawing Figure

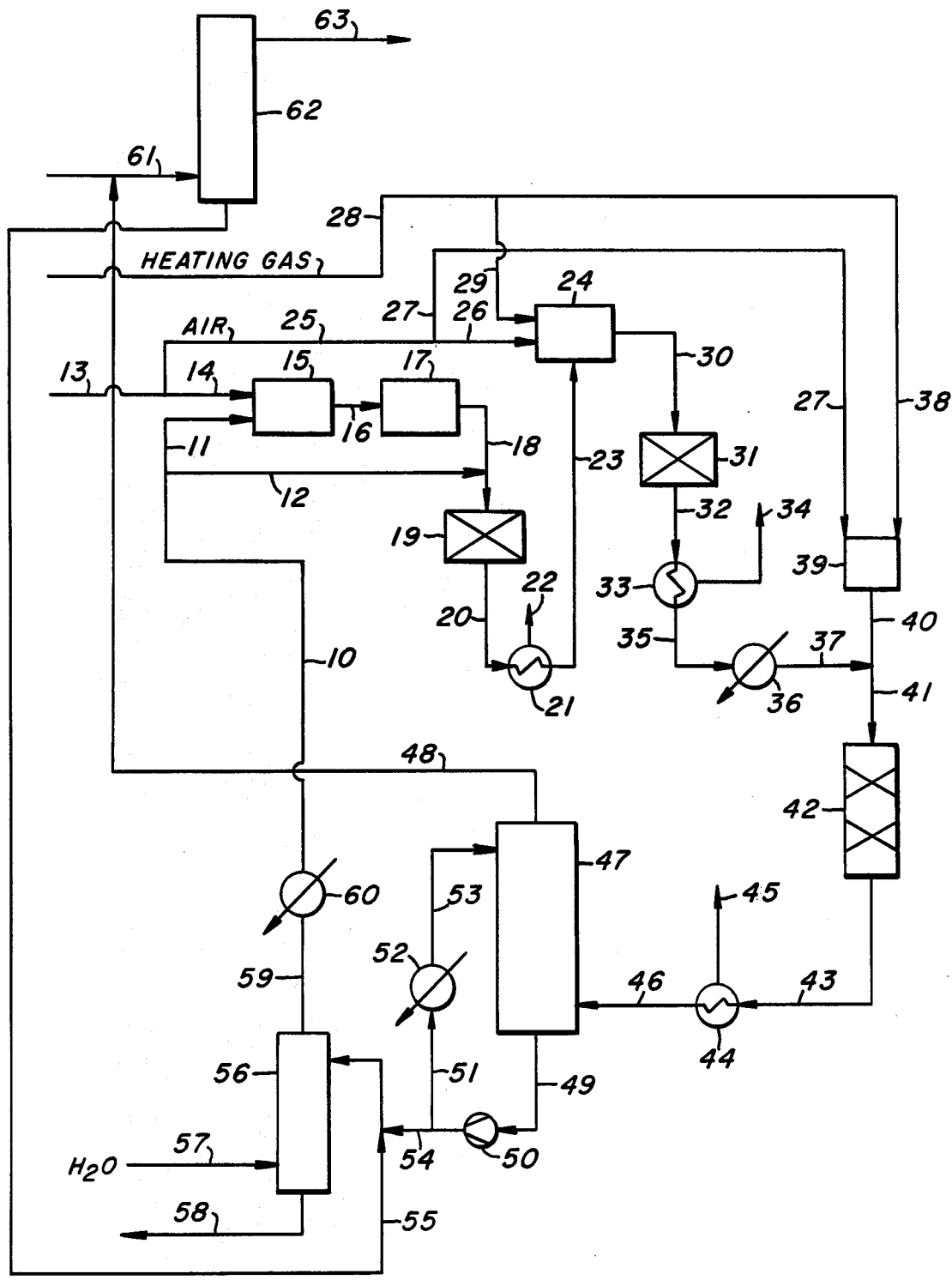

METHOD FOR REMOVING HYDROGEN SULFIDE FROM GASES AND FOR OBTAINING ELEMENTAL SULFUR

BACKGROUND OF THE INVENTION

Coke oven gas, like natural gas and refinery gases, normally contains relatively large amounts of hydrogen sulfide. When the gases are subsequently treated, either to form a synthesis gas or to be distributed and burned, the hydrogen sulfide has to be removed. When gases are desulfurized by the so-called oxidation method, hydrogen sulfide is oxidized to elemental sulfur in the liquid phase. In the neutralization method, in which the hydrogen sulfide occurs in the regeneration step, the hydrogen sulfide is converted to sulfuric acid in a sulfuric-acid plant or to elemental sulfur in a Claus plant. For economic reasons, the aforementioned Claus plants are usually two-stage, meaning that they have two catalytic stages.

Two-stage Claus plants reach a sulfur conversion rate of approximately 94%. They are, therefore, equipped with an afterburning chamber, in which the remaining hydrogen sulfide is burned to sulfur dioxide. In this manner, about 6% of the scrubbed hydrogen sulfide is released to the atmosphere in the form of sulfur dioxide which, of course, pollutes the atmosphere. For environmental reasons, therefore, this process is no longer acceptable.

In an effort to reduce the emission of sulfur dioxide into the atmosphere, it has been known to replace the afterburning unit in the aforementioned Claus plant with a hydrogenation stage which hydrogenates the sulfur compounds in the waste gas from the Claus plant to hydrogen sulfide with the use of coke oven gas. This rehydrogenated hydrogen sulfide is then scrubbed in a downstream hydrogen-sulfide scrubbing unit before the remaining gases are afterburned and introduced into the atmosphere as sulfur dioxide.

SUMMARY OF THE INVENTION

In accordance with the present invention, a new method is provided for removing hydrogen sulfide from gases wherein the emission of sulfur compounds into the atmosphere is essentially eliminated. The invention is based on a method for removing hydrogen sulfide from gases and for obtaining elemental sulfur, wherein the hydrogen sulfide is initially washed out of the gases, using a scrubbing solution, and is expelled from the scrubbing solution by adding water-vapor. Thereafter, the vapors, consisting mainly of hydrogen sulfide, are supplied to a Claus plant in which most of the hydrogen sulfide is converted to elemental sulfur and the gases leaving the Claus plant are hydrogenated. However, instead of simply burning these hydrogenated gases as in the past, they are cooled and added to the incoming coke oven gas or the like to be purified before it reaches the main hydrogen-sulfide scrubbing unit.

Thus, the residual gases from the Claus plant are heated by adding hot hydrogenation gases whereby the sulfur constituents in the residual gas, primarily sulfur dioxide and elemental sulfur, are reduced to hydrogen sulfide. After the waste heat has been made available for use downstream of the hydrogenation reactor, the gases enter a direct cooler. These gases still contain a large amount of hydrogen sulfide and, after leaving the cooler, are added to the crude gas to be desulfurized before the crude gas enters the hydrogen-sulfide scrubbing unit.

The condensate produced by cooling the hydrogenated gas is supplied to a separating unit in which the hydrogen sulfide is expelled from the condensate solution by adding water-vapor. Preferably, the process is in two stages, gases being cooled first in an indirect and then in a direct cooler.

The above and other objects and features of the invention will become apparent from the following detailed description taken in connection with the accompanying single FIGURE drawing which schematically illustrates the process of the invention.

With reference now to the drawing, coke oven gas or the like to be desulfurized flows through a conduit 61 to a hydrogen-sulfide scrubbing unit 62 where it is scrubbed with one of the known scrubbing solutions which largely free the hydrogen sulfide from the coke oven gas. The particular scrubbing solution used is unimportant as regards the present invention. The purified coke oven gas then leaves the hydrogen-sulfide scrubbing unit 62 through a conduit 63. The scrubbing solution, after removing the hydrogen sulfide from the coke oven gas, is supplied through conduit 55 to a deacidifier 56 into which water-vapor is introduced through conduit 57. The expelled acidic gases leave the deacidifier 56 through a conduit 59 and are cooled in cooler 60 to a temperature of approximately 50°–70° C. The deacidified waste water is then withdrawn from the unit 56 through a conduit 58 and either returned to the scrubber 62 or sent to an ammonia-separating unit for further treatment in accordance with usual practice. The expelled acidic gases, which mainly comprise hydrogen sulfide, are conveyed through conduit 10 to a Claus plant. In conduit 10, the gas is divided into two partial streams in the ratio of 1:3. The smaller stream is conveyed through conduit 11 to the combustion chamber 15 of the Claus plant into which air is supplied through conduits 13 and 14. The flue gases leaving combustion chamber 15, comprising sulfur dioxide, flow through conduit 16 to a waste-heat boiler 17 for producing water-vapor. From boiler 17, the sulfur dioxide is combined in conduit 18 with the hydrogen sulfide in conduit 12, the mixture passing to a first reactor 19 filled with a catalyst in which the actual conversion to elemental sulfur occurs in accordance with the equation: d

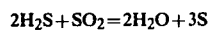

$$2H_2S + SO_2 = 2H_2O + 3S$$

Various types of catalysts can be utilized in the reactor 19 in accordance with known procedures, the reaction between hydrogen sulfide and sulfur dioxide continuing within the reactor until equilibrium. The gases leaving the reactor 19 are conveyed through conduit 20 to a waste-heat boiler 21 in which the sulfur condenses out and the water-vapor is withdrawn through conduit 22.

Next, the cooled gas from the waste-heat boiler containing hydrogen sulfide and entrained particles of elemental sulfur are supplied through conduit 23 to a second combustion chamber 24 which is supplied with the required amount of air through conduits 25 and 26 and the required amount of heating gas through conduits 28 and 29. The hot-process gases are then conveyed through conduit 30 to a second reactor which contains the same catalyst as reactor 19. The heat liberated in the reactor 31 is used in a waste-heat boiler 33 supplied with the hot-process gases through conduit 32 to produce water-vapor which is withdrawn through the conduit 34. The sulfur particles entrained within the gas stream in conduit 35 are separated in a sulfur separator and cooler 36. After leaving the cooler 36, the residual gas from the Claus plant is sent through conduit 37 and mixed with a hot-hydrogenation gas produced in a combustion chamber 39 which is supplied with coke oven gas through conduit 38 and with a sub-stoichiometric quantity of air through conduit 27. Hydrogenation gases leave the combustion chamber through conduit 40 and, together with the residual gases from the Claus plant, flow through conduit 41 to a hydrogenation reactor 42 in which the sulfur dioxide and entrained elemental sulfur in the gas are hydrogenated to hydrogen sulfide.

After hydrogenation, the gas is conveyed through conduit 43 to a waste-heat boiler 44, where some of its heat is withdrawn as well as water-vapor which passes through conduit 45. The gas is further cooled to ambient temperature in a direct cooler 47 which is supplied with the hydrogen sulfide gas through conduit 46. The water for cooling the gas is supplied to the cooler 47 through conduit 53, the resulting hot water being conveyed through conduit 49 to a pump 50 and recycled to cooler 47 through conduit 51, an indirect cooler 52 and conduit 53. Excess water produced by condensation of water-vapor from the process gases is conveyed through conduit 54 to the deacidifier 56, where hydrogen sulfide in the condensate is expelled and recycled.

The cooled process gases in conduit 48, which contain approximately 10–15 grams of hydrogen sulfide per $Nm^3$, are mixed with coke oven gas in conduit 61 entering scrubber 62 and are desulfurized in the downstream scrubber. Consequently, no waste gas escapes from the Claus plant into the atmosphere. Since the waste gas from the Claus plant is mixed with the coke oven gas, the calorific value of the coke oven gas is reduced by about 2%. However, this method increases the efficiency of a Claus plant to 100%, relative to sulfur. The process does not yield any waste gas or water harmful to the envornment.

Although the invention has been shown in connection with a certain specific embodiment, it will be readily apparent to those skilled in the art that various changes in method steps can be made to suit requirements without departing from the spirit and scope of the invention.

We claim as our invention:

1. A method for removing hydrogen sulfide from gases and for obtaining elemental sulfur comprising scrubbing the gases with a scrubbing solution in a hydrogen-sulfide scrubber whereby hydrogen sulfide is scrubbed out of the gases, expelling the hydrogen sulfide from the scrubbing solution in a deacidifier using water vapor, converting the hydrogen sulfide from the deacidifier in a reaction chamber to form reaction products of elemental sulfur and residual sulfur-bearing gases, hydrogenating the residual sulfur-bearing gases passing from the reaction chamber to form hydrogen sulfide gas and water vapor, cooling the thus-formed hydrogen sulfide gas and water vapor to recover condensed water, supplying at least a portion of the condensed water to said deacidifier, and mixing the cooled hydrogen sulfide gas with the gases passing into said hydrogen-sulfide scrubber.

2. The method of claim 1 wherein said first-mentioned gases comprise coke oven gas and in which hydrogen sulfide is converted to elemental sulfur in a Claus plant.

* * * * *

UNITED STATES PATENT OFFICE
CERTIFICATE OF CORRECTION

Patent No. 4,150,104             Dated   April 17, 1979

Inventor(s)  Edmund-Theodor Herpers and Horst Ritter

It is certified that error appears in the above-identified patent and that said Letters Patent are hereby corrected as shown below:

Add to the facing sheet:

Foreign Application Priority Data

October 2, 1976 [DE] Fed. Rep. of Germany -------- 26 44 617

Signed and Sealed this

*Twenty-first* Day of *August 1979*

[SEAL]

*Attest:*

LUTRELLE F. PARKER

*Attesting Officer*     *Acting Commissioner of Patents and Trademarks*